(12) United States Patent
Holt

(10) Patent No.: US 6,404,862 B1
(45) Date of Patent: Jun. 11, 2002

(54) AUTHENTICATION DEVICE

(75) Inventor: Nicholas Peter Holt, Glossop (GB)

(73) Assignee: International Computers Limited, Putney (GB)

( * ) Notice: Subject to any disclaimer, the term of this patent is extended or adjusted under 35 U.S.C. 154(b) by 0 days.

(21) Appl. No.: 09/311,512

(22) Filed: May 13, 1999

(30) Foreign Application Priority Data

May 29, 1998 (GB) ............................................. 9811446

(51) Int. Cl.[7] ............................................. H04M 11/00
(52) U.S. Cl. .................................................. 379/93.02
(58) Field of Search ........................... 379/91.01, 93.02, 379/93.03, 93.12, 93.26, 93.28, 93.37, 441, 443, 444

(56) References Cited

U.S. PATENT DOCUMENTS

| 4,430,728 | A | * | 2/1984 | Beitel et al. ............. 379/93.02 |
| 4,694,492 | A | * | 9/1987 | Wirstrom et al. ........ 379/93.02 |
| 5,351,296 | A | * | 9/1994 | Sullivan ................... 379/93.02 |
| 5,406,619 | A | * | 4/1995 | Akhteruzzaman et al. ....................... 379/93.02 |
| 5,740,232 | A | * | 4/1998 | Pailles et al. ............ 379/93.02 |
| 5,770,849 | A | * | 6/1998 | Novis et al. |
| 5,987,155 | A | * | 11/1999 | Dunn et al. |

FOREIGN PATENT DOCUMENTS

WO    WO 95/04328    *   2/1995

* cited by examiner

Primary Examiner—Wing F. Chan
(74) Attorney, Agent, or Firm—Lee, Mann, Smith, McWilliams, Sweeney & Ohlson

(57) ABSTRACT

An authentication device consists of a hand-held unit having a receptacle for a smart card and an audio interface for communication with a telephone line. A challenge-and-response authentication procedure is performed between the smart card and a remote service. The device is dedicated solely to said authentication procedure and has no display.

5 Claims, 2 Drawing Sheets

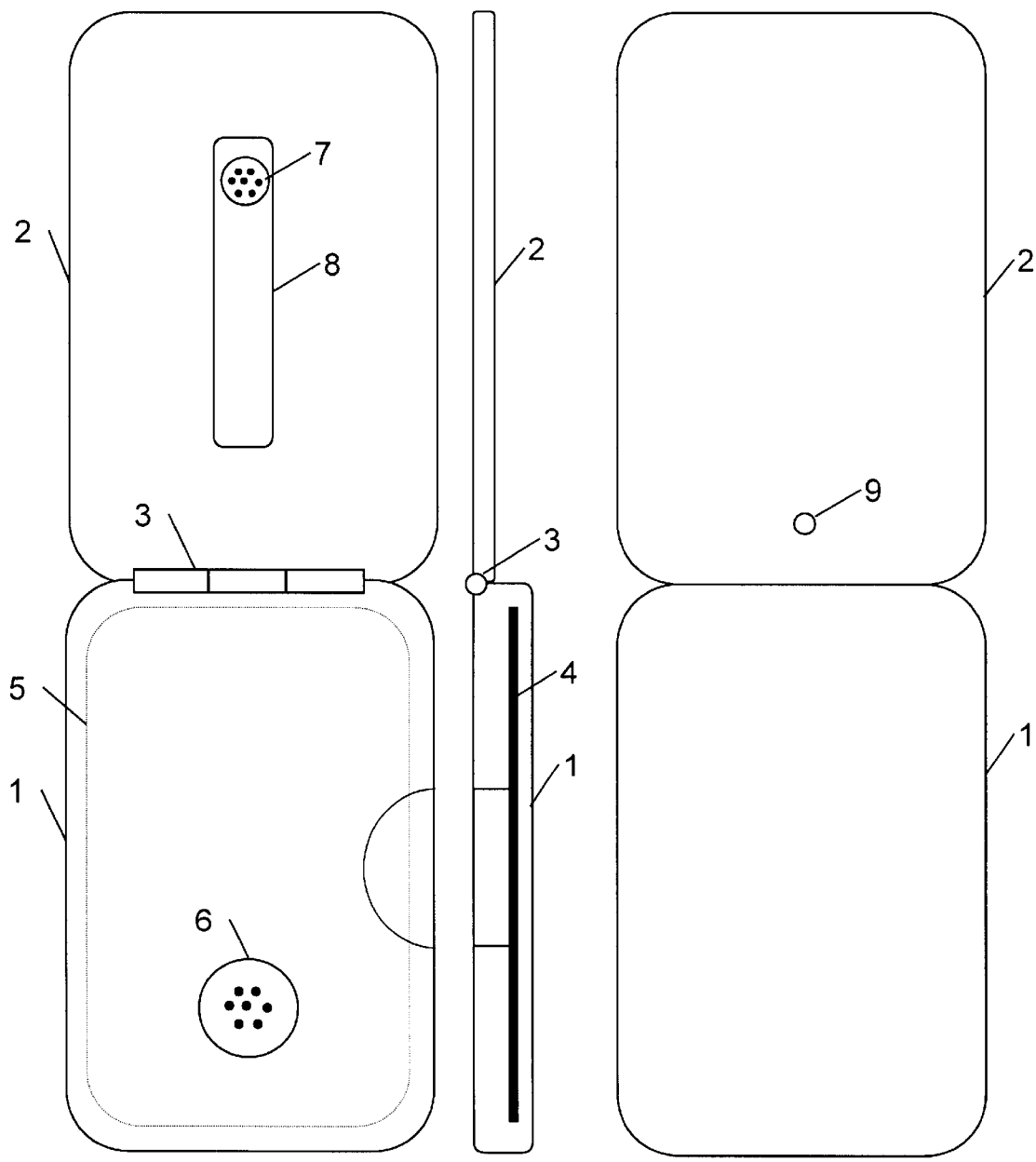

AUTHENTICATION DEVICE

BACKGROUND TO THE INVENTION

This invention relates to an authentication device for use over a telephone line.

There are a number of situations where a person may be required to authenticate his or her identity to a remote service over a telephone line. For example, authentication is required when a customer calls a bank to obtain account details, or when a person calls a government department in connection with a benefit claim. Conventional methods, such as asking for date of birth or mother's maiden name, provide only a minimal degree of security.

U.S. Pat. No. 5,406,619 describes a universal authentication device which is the size and shape of a credit card, and contains a microprocessor, keypad, LCD display, and audio interface for receiving and transmitting signals over a telephone line when the device is held close to the telephone earpiece or mouthpiece. In operation, the remote service sends a random challenge over the telephone line to the device. The device generates a response, e.g. by encrypting the challenge, and returns the response over the telephone line to the remote service. The remote service compares the response with the expected response, and if they match, authenticates the user.

PCT Patent Application No. 95/04328 describes a portable hand-held device containing a microprocessor, keypad, LCD display, and audio interface for connection to a telephone line. The device also contains a receptor for an integrated circuit card (smart card). The device may be used for a large number of functions, controlled by program modules stored internally or on the smart card. One function provides identification of the user via the telephone, using a challenge and response mechanism.

A problem with both of these prior proposals is that they are relatively complex, and hence would be relatively expensive to implement. The object of the present invention is to provide an improved authentication device, which does not have these disadvantages.

SUMMARY OF THE INVENTION

According to the invention an authentication device comprises a hand-held unit having a receptacle for a smart card and an audio interface for communication with a telephone line to permit a challenge-and-response authentication procedure between the smart card and a remote service, the device being dedicated solely to said authentication procedure and having no display.

It will be seen that, because the device is dedicated solely to the authentication procedure and has no display, it can be implemented very simply and cheaply. In a preferred form of the invention, the device also has no keypad, allowing it to be implemented even more cheaply.

BRIEF DESCRIPTION OF THE DRAWINGS

FIGS. 1, 2 and 3 are front, side and back views of a first authentication device.

DESCRIPTION OF AN EMBODIMENT OF THE INVENTION

Figure 4:
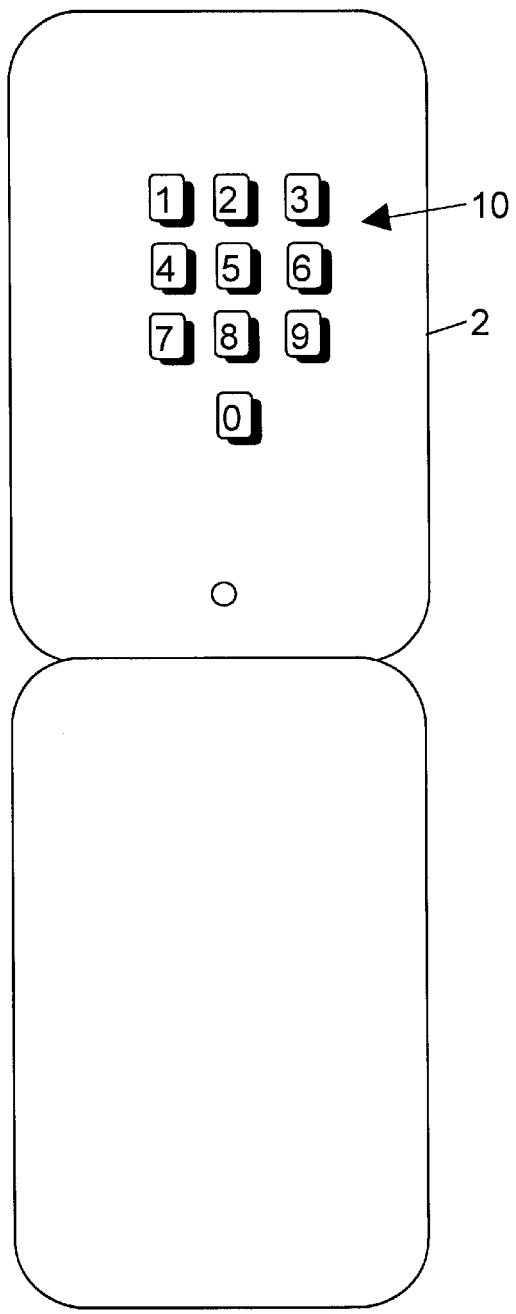
FIG. 4 is a back view of an alternative form of the device.

One authentication device in accordance with the invention will now be described by way of example with reference to the accompanying drawings.

Referring to FIGS. 1 to 3, the authentication device is a hand-held unit, comprising a main body 1, with a flap 2 connected to the main body by a hinge 3. The main body 1 has a slot 4 which can receive a smart card 5. The device contains two flat audio transducers 6, 7 which act as loudspeaker and microphone respectively. The loudspeaker 6 is mounted in the main body 6, and in this example is a piezo-electric transducer. The microphone 7 is mounted in the flap 2, and in this example is a sub-miniature electret device. The microphone 7 is slidable within a slot 8 to allow adjustment of the distance between the two transducers 6 and 7. A light-emitting diode (LED) 9 is provided on the back of the flap 2.

In the present example, the main body is 96 mm×62.5 mm in size, and can receive an 85 mm×52.5 mm smart card. The distance between the centres of the two transducers 6 and 7 can be adjusted in the range 96 mm to 140 mm.

The device also contains electronics (not shown) for interfacing to the smart card and for sending and receiving information over the telephone connection by way of the audio transducers. In effect, these electronics provide a simple modem (modulator/demodulator) unit. The electronics, the LED, and also the smart card, are powered by a battery (not shown), housed within the device.

When the device is not in use, the flap 2 is folded against the main body 1, and in use it is folded outwards into the position as shown in FIGS. 1–3. The smart card 5 may normally be kept in its slot 4 when the device is not in use, so that the device acts as a wallet for protecting the card. Some form of seal (not shown) may be provided to prevent dirt from entering the slot 4, which could foul the contacts for the card.

Opening the device activates it, and the LED 9 starts flashing to indicate that the device is ready for use. The device remains activated for a predetermined time-out period, after which it is deactivated to conserve the battery.

When the device is opened out into its in-use position, it can be placed over a telephone handset (not shown), with the loudspeaker 6 next to the telephone mouthpiece and the microphone 7 next to the telephone earpiece. When so positioned, the device can send tone signals over the telephone line, by way of the loudspeaker 6, and can receive signals from the telephone line, by way of the microphone 7. It may be necessary to adjust the distance between the transducers 6, 7 to suit the particular handset, by sliding the microphone 7 within the slot 8.

In use, the user first dials up the remote service that the user wishes to access, on a conventional telephone. When the service answers, it prompts the user, by means of a voice message, to place the activated device over the telephone handset. The remote service and the device then exchange tone signals, similar to conventional modems establishing a link with each other: the remote service repeatedly sends a tone signal to the device until the device responds. This informs the remote service that the device is now ready.

The remote service then transmits a randomly-generated challenge to the device, as a series of tones over the telephone line. The device receives the challenge and passes it to the smart card. The smart card encrypts the challenge, using a private key stored in the smart card, so as to generate a response. The device then transmits the response to the remote service, as a series of tones over the telephone line. The device also transmits the user's identity.

When the remote service receives the response, it decrypts the response using the user's public key, and compares it with the challenge. If they match, the user's identity is authenticated, and the remote service returns a confirmation message to the device. When the device receives this confirmation message, it illuminates the LED 9 continuously, to indicate that the user may now remove the device from the handset. Access to the service can now proceed in the normal manner.

It should be noted that the device described above has no keypad or display, and is dedicated solely to the function of authenticating the user, and can therefore be very simple and cheap.

Some Possible Modifications

It will be appreciated that many modifications may be made to the system described above without departing from the scope of the present invention.

For example, as shown in FIG. 4, a keypad 10 may be provided, to allow the user to enter a PIN to activate the smart card. This allows the user to prove to the smart card that it is in the possession of the right person. The keypad may be a conventional flat rubber mat type keypad.

Instead of providing a keypad on the device, the telephone dialling keypad may be used to enter the user's PIN into the device. This involves the risk of the tones being overheard. However, it also allows the PIN to be checked by the remote service, which can, if required, take action if it detects more than a predetermined number of attempts to enter a wrong PIN.

Instead of using a keypad, the device could incorporate a biometric sensor, for example a fingerprint reading device. The biometric data together with data securely stored on the smart card (and/or data stored in the remote service), would be used to authenticate that the card was in the possession of its rightful owner, and would thus eliminate the need for entry of the user's PIN. A related possibility would be to use voice-recognition technology, either via the microphone on the device, or over the telephone line.

In another possible modification, the device may contain only one audio transducer, which is used for both transmitting and receiving. This would require one or more further LEDs, to indicate whether the device is to be held against the earpiece or mouthpiece of the telephone.

Other forms of audio transducer may be used. For example, instead of using a microphone transducer, an induction device may be used to pick up electrical signals directly from the telephone handset. This option may not be suitable for some types of telephone.

Instead of having just one LED, the device may include a plurality of LEDs. For example, one LED may be used to indicate that the device is ready, and a second LED to indicate that the device can be removed from the telephone. Another possibility would be to use a single, multi-colour LED, although this might cause problems for colour-blind people.

Instead of a contact-connected smart card, a contactless smart card could be used. This would significantly improve the reliability of the device by eliminating the possibility of dirty contacts.

Figure 5:
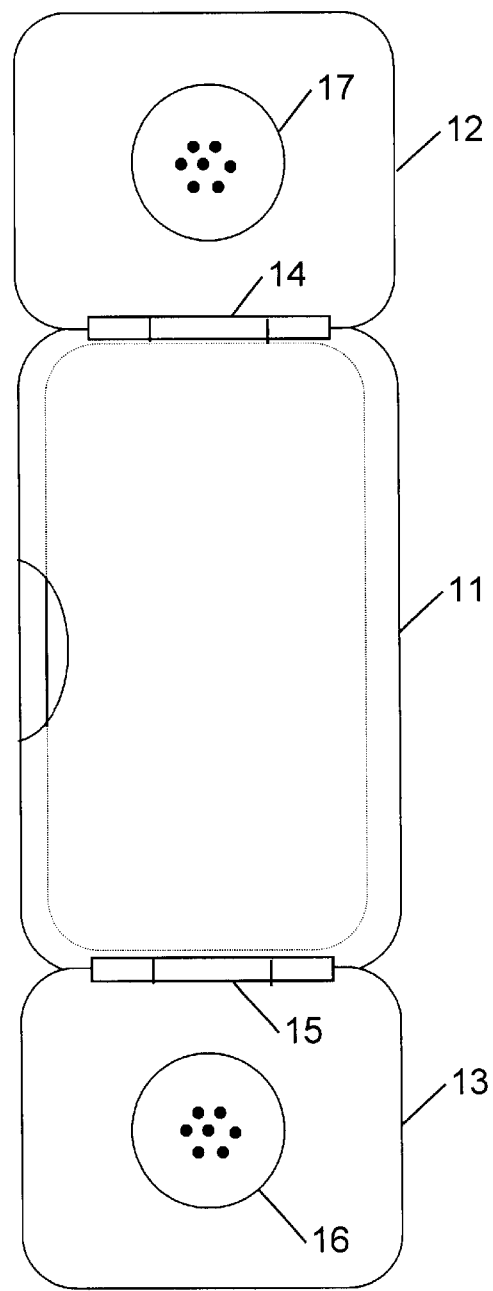
FIG. 5 is a front view of another alternative form of the device.

In the embodiment described above, the device comprises two parts. However, it will be appreciated that other configurations are possible. For example, as shown in FIG. 5, the device may comprise a main body 11 with two flaps 12, 13, connected to the main body by hinges 14, 15, and with audio transducers 16, 17 mounted in the flaps.

In the described embodiment, the remote service and the device exchange tone signals in order to establish a link with each other, before the remote service sends a challenge. Alternatively, if the signal standards were pre-defined (e.g. bit rate, modulation type etc.) it would be possible for the remote service just to send the challenge repeatedly, until it receives a response.

What is claimed is:

1. An authentication device comprising a hand-held unit having a receptacle for a smart card and a bidirectional audio interface for communication with a telephone line by respectively sending sound signals to and receiving sound signals from a telephone mouthpiece and earpiece, to permit a challenge-and-response authentication procedure between the smart card and a remote service, the device being dedicated solely to said authentication procedure and having no display.

2. An authentication device according to claim 1 wherein the device has no keypad.

3. An authentication device according to claim 1 wherein the audio interface comprises at least one flat audio transducer.

4. An authentication device according to claim 1, including at least one indicator light for indicating when the device should be placed adjacent to a telephone earpiece and mouthpiece to allow reception and transmission.

5. A method of authenticating a person's identity over a telephone line, comprising the steps:

(a) providing an authentication device comprising a hand-held unit having a receptacle for a smart card and a bidirectional audio interface for communication with a telephone line by respectively sending sound signals to and receiving sound signals from a telephone mouthpiece and earpiece; and (b) performing a challenge-and-response authentication procedure between the smart card and a remote service, the device being dedicated solely to said authentication procedure and having no display.

\* \* \* \* \*